June 5, 1934.     A. B. HENDRICKS, JR     1,961,761
WINDING CLAMP FOR ELECTRICAL INDUCTION APPARATUS
Filed Dec. 30, 1933
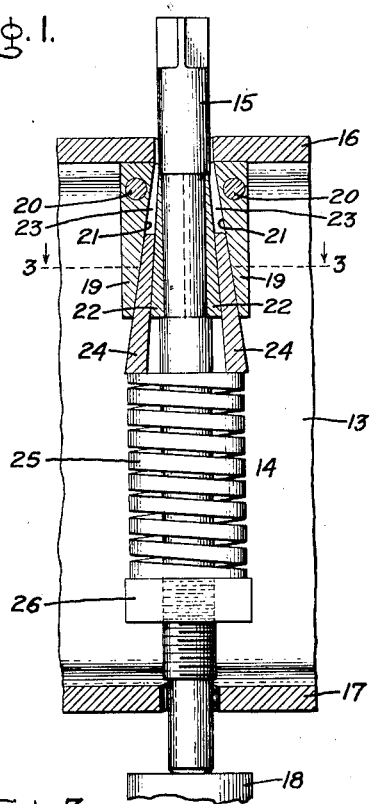
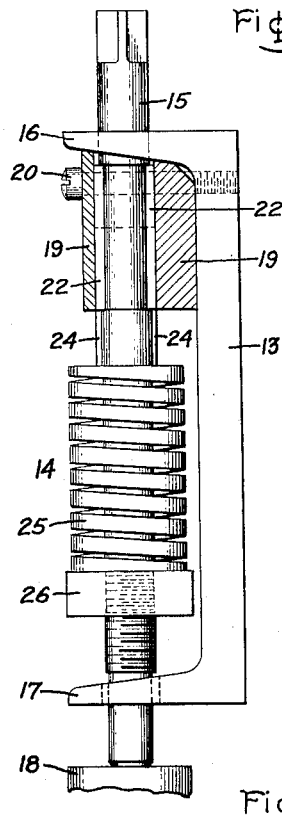
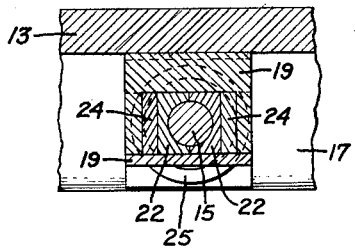
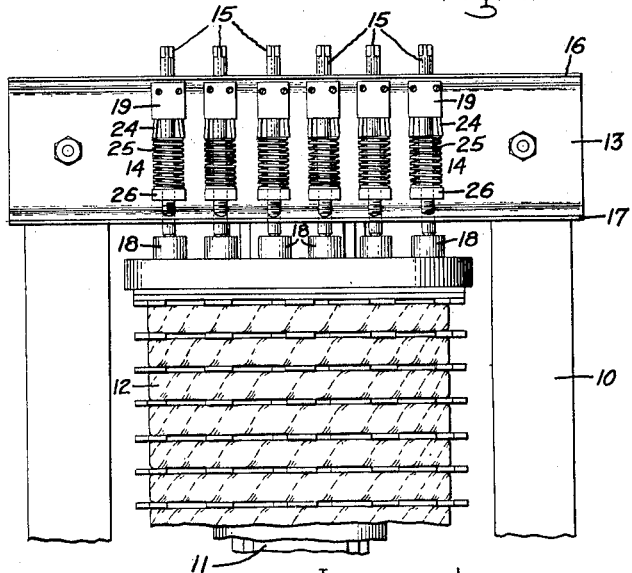
Inventor:
Allan B. Hendricks, Jr,
by Harry E. Dunham
His Attorney Patented June 5, 1934

1,961,761

UNITED STATES PATENT OFFICE 1,961,761

WINDING CLAMP FOR ELECTRICAL INDUCTION APPARATUS

Allan B. Hendricks, Jr., Pittsfield, Mass., assignor to General Electric Company, a corporation of New York Application December 30, 1933, Serial No. 704,639

5 Claims. (Cl. 175—356)

My invention relates to winding clamps for electrical induction apparatus such as a transformer or reactor with a magnetic core and a stack of winding turns or coils on the core. The windings of such apparatus must be secured in place on the core by some means mechanically strong enough to prevent their displacement by the magnetic forces which may occur during operation of the apparatus. These magnetic forces may sometimes be very great as in the case of an accidental short circuit of the secondary winding of a large power transformer. The insulation used between the turns and between the sections of a winding is commonly formed of fibrous organic material such as cotton and paper and is therefore compressible. Although the winding with its insulation may be initially highly compressed, it may shrink during service and it is desirable that the clamps or other means provided to hold it in place on the core continue to hold it in place permanently even after possible shrinkage of the winding. The general object of the invention is to provide an improved winding clamp having these desirable features.

The invention will be explained in the following description taken in connection with the accompanying drawing in which Fig. 1 is a front view, partly in section, of a winding clamp constructed in accordance with the invention; Fig. 2 is a side view, partly in section of the same clamp; Fig. 3 is a sectional view on the line 3—3 of Fig. 1; and Fig. 4 is a view of a portion of a transformer provided with winding clamps in accordance with the invention.

Like reference characters indicate similar parts in the different figures of the drawing.

The invention will be explained in connection with the transformer shown in Fig. 4 and which includes a magnetic core 10 with a winding leg 11 surrounded by a winding 12. The core is provided with a metal channel forming a core clamp 13 bolted along one of the core yokes. The core clamp or channel 13 serves as a support for a plurality of winding clamps 14 which compress the winding 12 and clamp it in position on the core.

Each winding clamp 14 includes a stud or rod 15 extending through aligned openings in the flanges 16 and 17 of the channel 13, the flanges 16 and 17 forming guides for the rods 15. The inner or lower ends of the rods 15 rest on bearing blocks 18 carried by the winding 12. The outer or upper ends of the rods 15 extend beyond the channel 13 and are squared so that they may be turned with a wrench.

A wedge block 19 surrounds each rod 15 just inside the outer flange 16 of the channel 13 and is secured in place against the inner surface of the flange by screws 20. This wedge block 19 has two opposed inner wedge surfaces 21 spaced from opposite sides of the rod 15. The other two inner surfaces of the wedge block 19 are preferably parallel to each other and at right angles to the surfaces 19. A split tapered block 22 surrounds and fits a reduced section of the rod 15 inside the wedge block 19. This tapered block 22 fits between the shoulders at opposite ends of the reduced section of the rod 15 to prevent relative longitudinal displacement between the block and rod. The tapered block 22 has two outer surfaces opposed to and spaced from the surfaces 21 of the surrounding wedge block 19 to define two tapered spaces 23. Wedges 24 extend part way into these tapered spaces 23, the outer or lower ends of the wedges 24 extending beyond and below the wedge block 19 and the tapered block 22. A strong helical spring 25 is normally compressed between the outer ends of the wedges 24 and a nut 26 threaded onto the rod 15 and forming a stop on the rod near the flange 17 but spaced from this flange. The parts may be assembled with the spring 25 extended and the nut 26 close to the flange 17. The nut 26 may be square with one side close to the channel 13 to that the nut cannot turn with the rod 15. Then, by turning the rod 15, the nut will be drawn up toward the wedges 24 to place the spring 25 in compression. The spring 25 then constantly forces the wedges 24 tightly into their seats and acts through the nut 26 to press the rod 15 toward the winding 12 of the transformer.

The wedges 24 prevent at all times any movement of the rod 15 away from the winding 12 but permit it to be moved by the spring 25 toward the winding to keep the winding under compression. After the parts have been assembled with the winding 12 compressed and held in place on the core 10 as has been described, the winding 12 may shrink during service. If this happens, the springs 25 will actuate the rods 15 and force them to follow the winding and keep it compressed and in place on the core. As the rods 15 with the tapered blocks 22 move toward the winding 12, the tapered spaces 23 become wider but the springs 25 then actuate the wedges 24 and force them deeper into these spaces to keep them always seated tightly between the tapered surfaces of the wedge block 19 and the tapered block 22. Thus, the winding 12 cannot subsequently expand but it still held tightly compressed and in place on the core even after shrinkage.

The invention has been explained by describing and illustrating a particular winding clamp and its application in connection with a transformer winding but it will be apparent that changes may be made without departing from the spirit of the invention and the scope of the appended claims.

What I claim as new and desire to secure by Letters Patent of the United States, is,—

1. A winding clamp including a clamping member, a spring for pressing said clamping member toward a winding to compress it, and means including a wedge to prevent movement of said clamping member away from the winding, said wedge being pressed toward its seat by said spring.

2. A winding clamp including a clamping rod, means including a wedge to prevent movement of said rod away from a winding, and means including a spring to press said rod toward the winding to compress it and said wedge away from the winding to prevent movement of said rod away from the winding.

3. A winding clamp including a clamping rod, means including a wedge to prevent movement of said rod away from a winding, a stop on said rod, and a spring compressed between said stop and said wedge to press said wedge toward its seat and said rod toward the winding.

4. A winding clamp including a clamping rod having a reduced portion, a wedge member on the reduced portion of said rod, a stop on said rod, a fixed wedge member surrounding and spaced from said first wedge member, a wedge between said wedge members, and a compressed spring between said wedge and stop.

5. A winding clamp including a clamping rod having a reduced portion, a split member with wedge seat surfaces on the reduced portion of the rod, a wedge block surrounding said split member and having wedge seat surfaces spaced from those of said split member, wedges between the wedge surfaces of the split member and the wedge block, a stop on said rod, and a compressed spring between said stop and said wedges.

ALLAN B. HENDRICKS, Jr.